May 20, 1924.
C. T. EAID
1,494,345
CONTINUOUS PROCESS MOLDING MACHINE FOR FICTILE MATERIAL
Original Filed Oct. 6, 1919   11 Sheets-Sheet 1
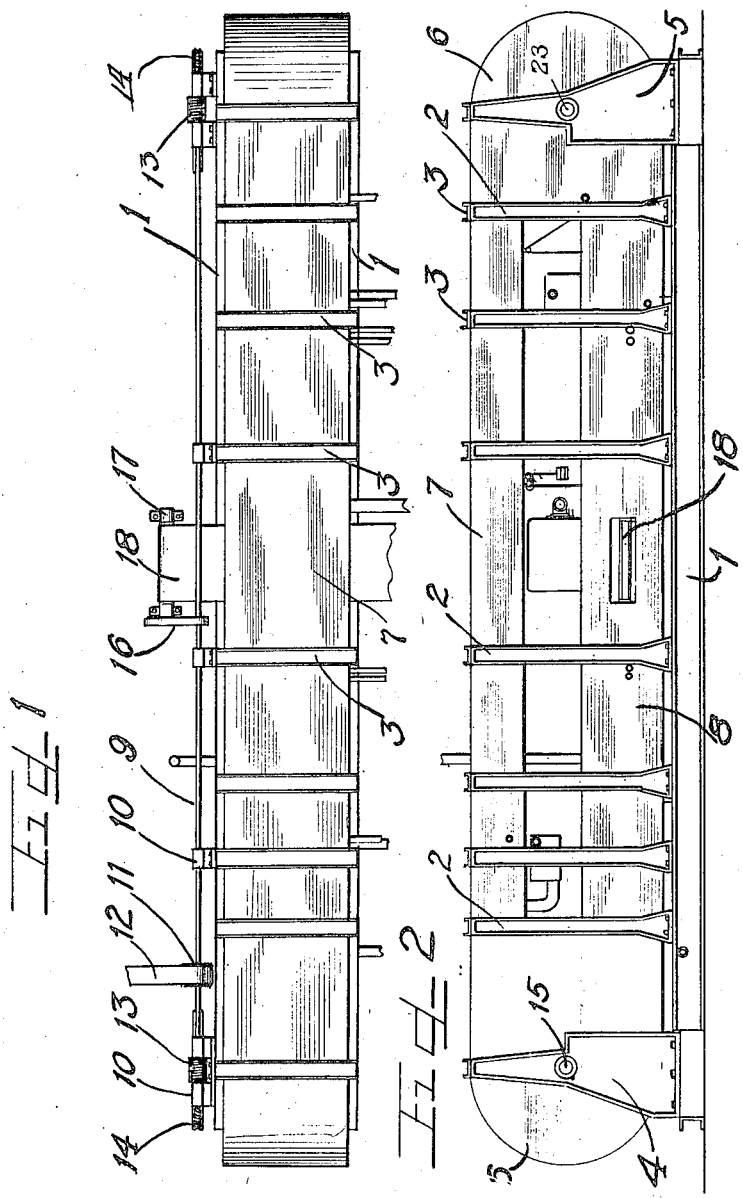
Witnesses
J. W. Angell
Charles Hill Jr.
Inventor
Clayton T. Eaid.
by Charles W. Hill
Atty.

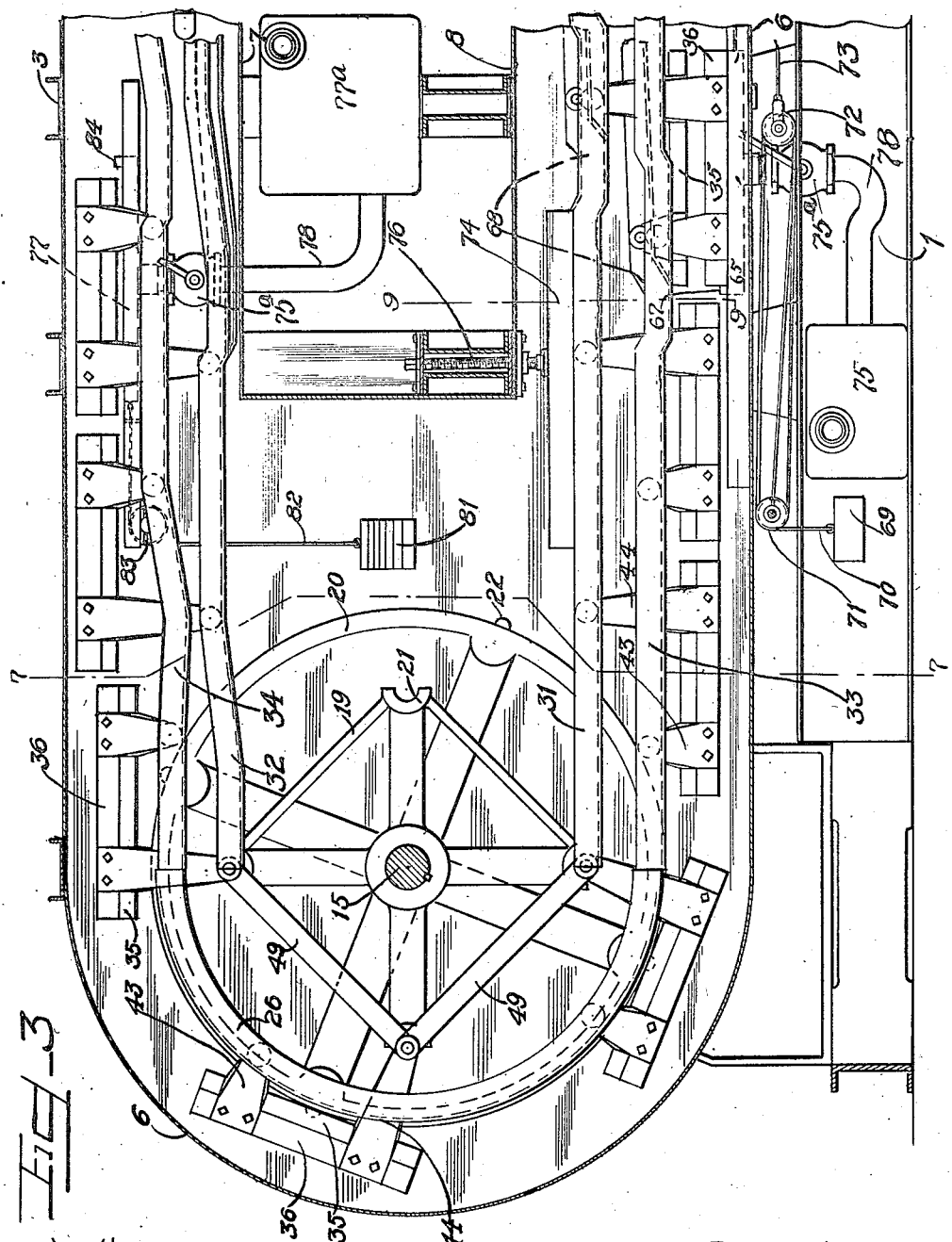

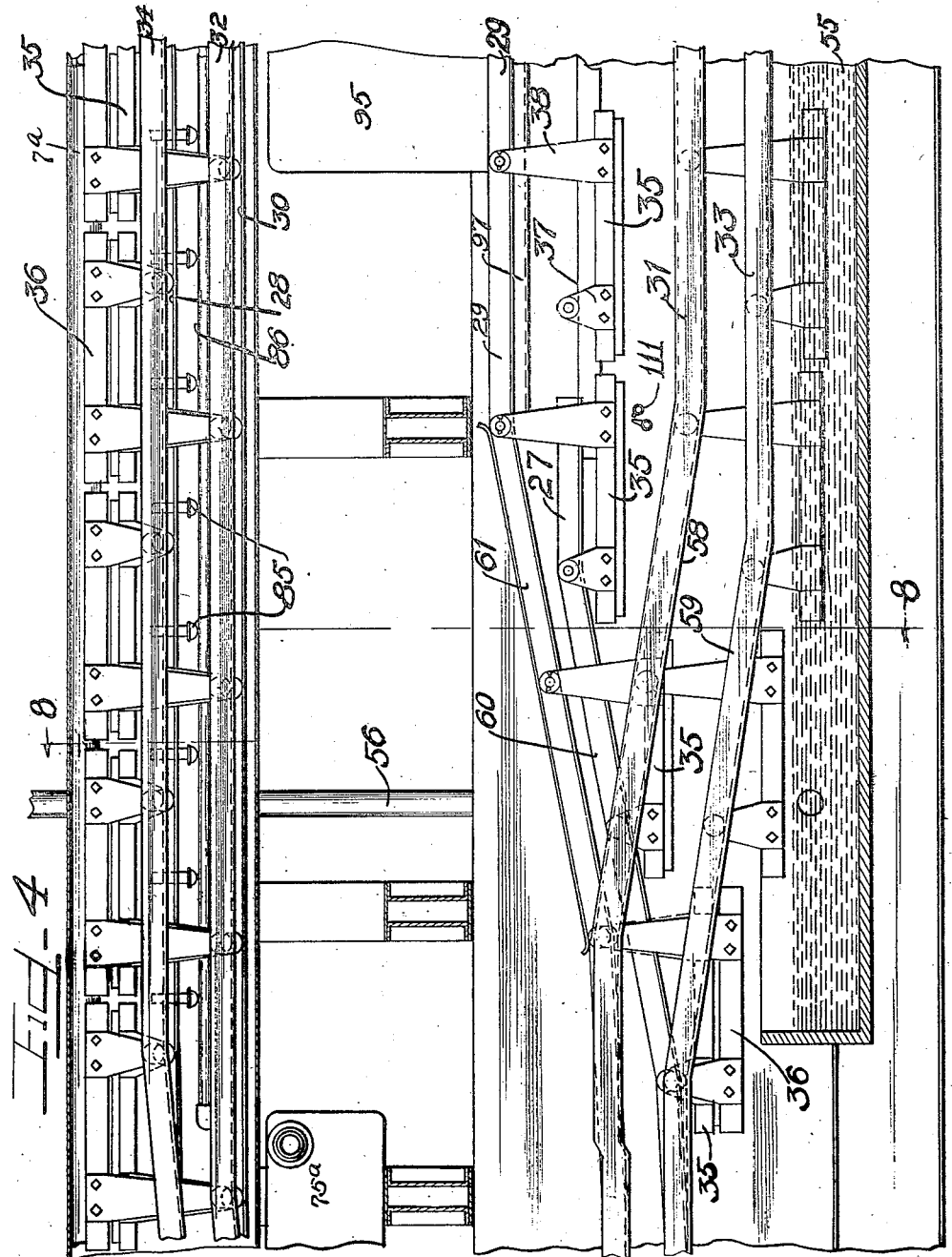

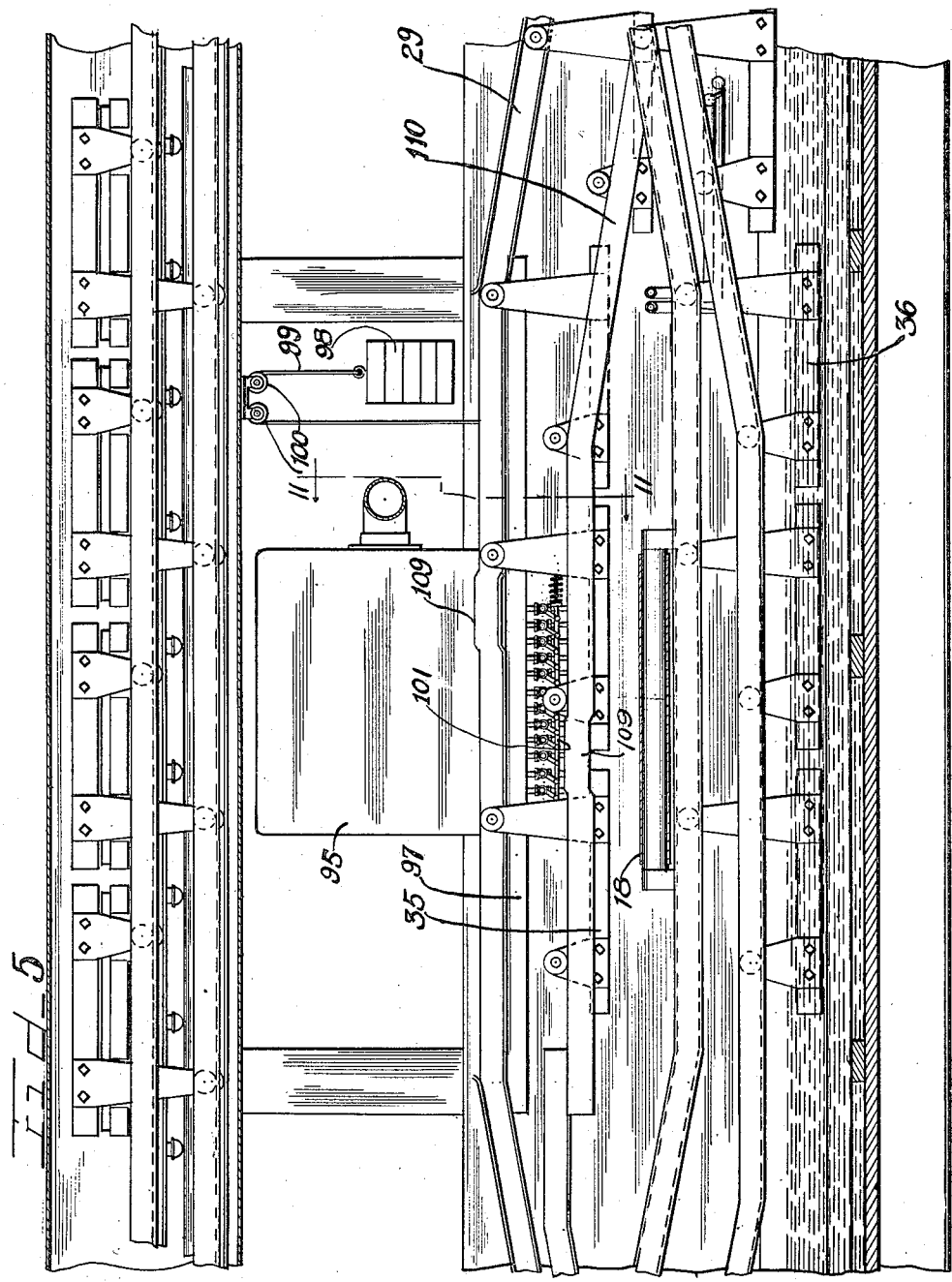

May 20, 1924.
C. T. EAID
1,494,345
CONTINUOUS PROCESS MOLDING MACHINE FOR FICTILE MATERIAL
Original Filed Oct. 6, 1919   11 Sheets-Sheet 5
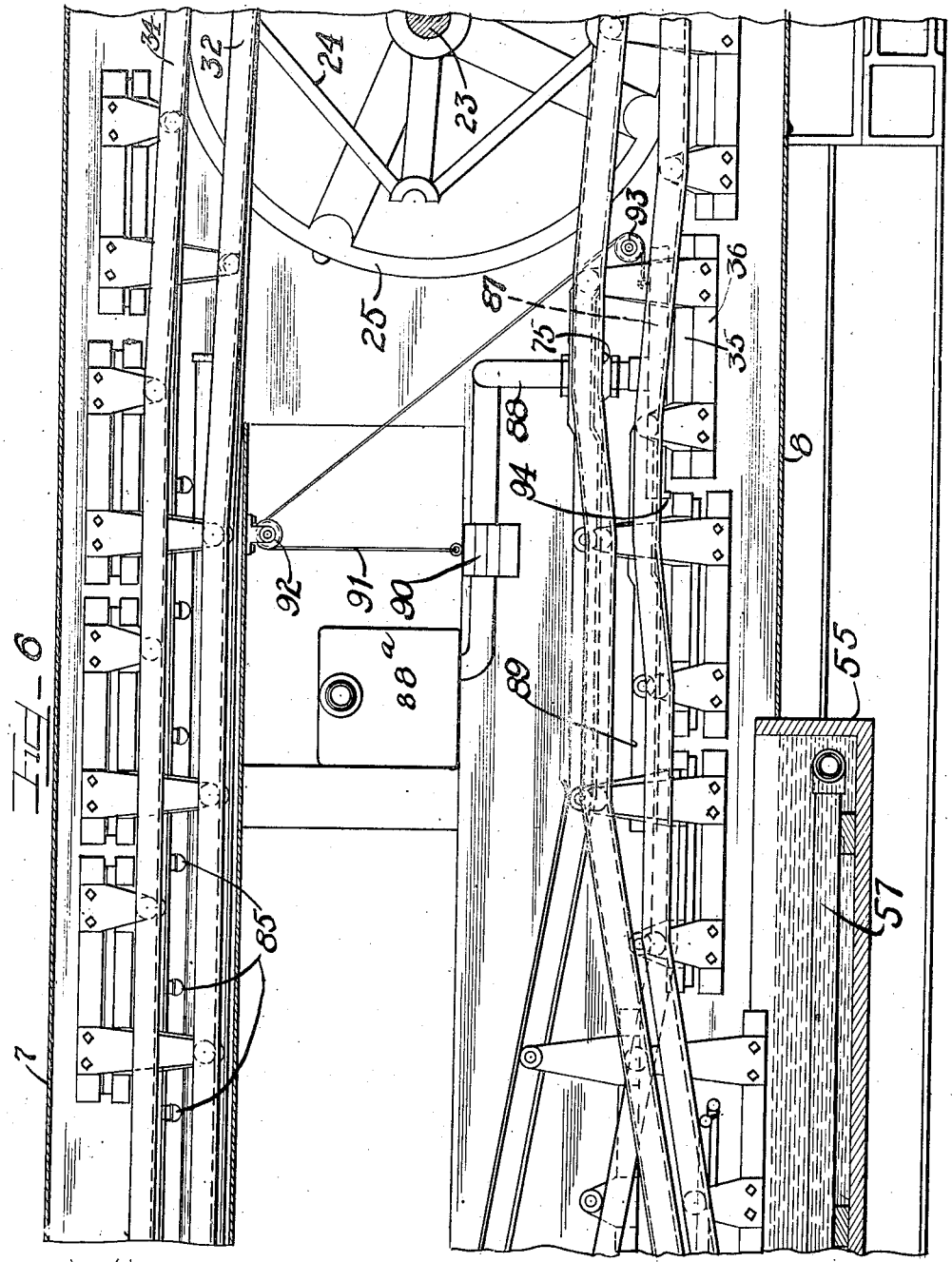

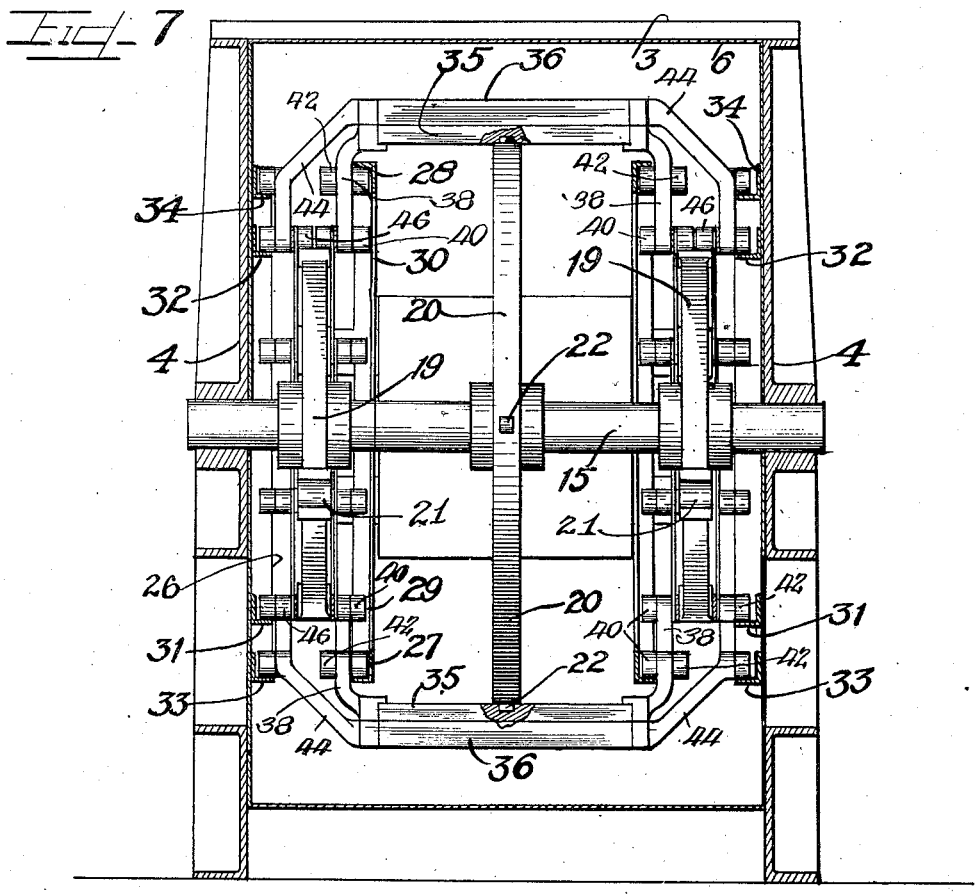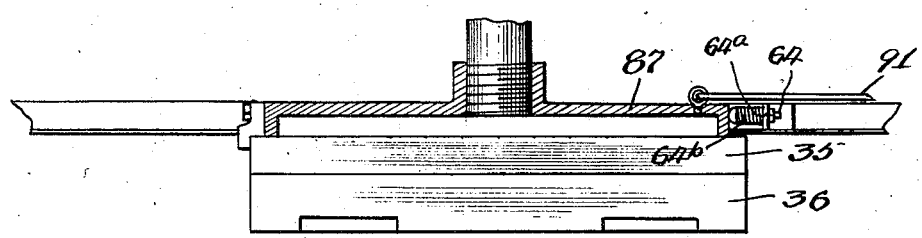

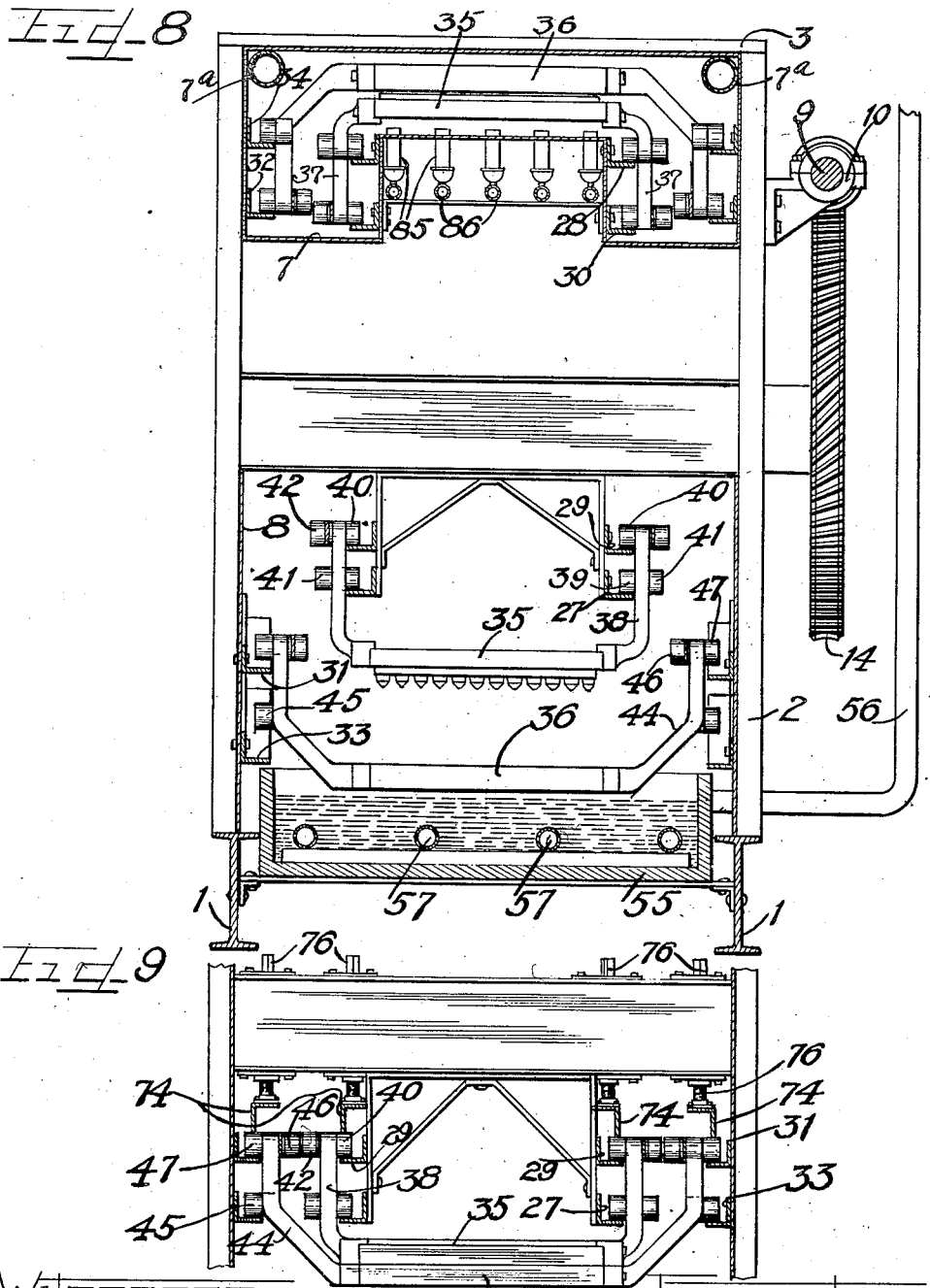

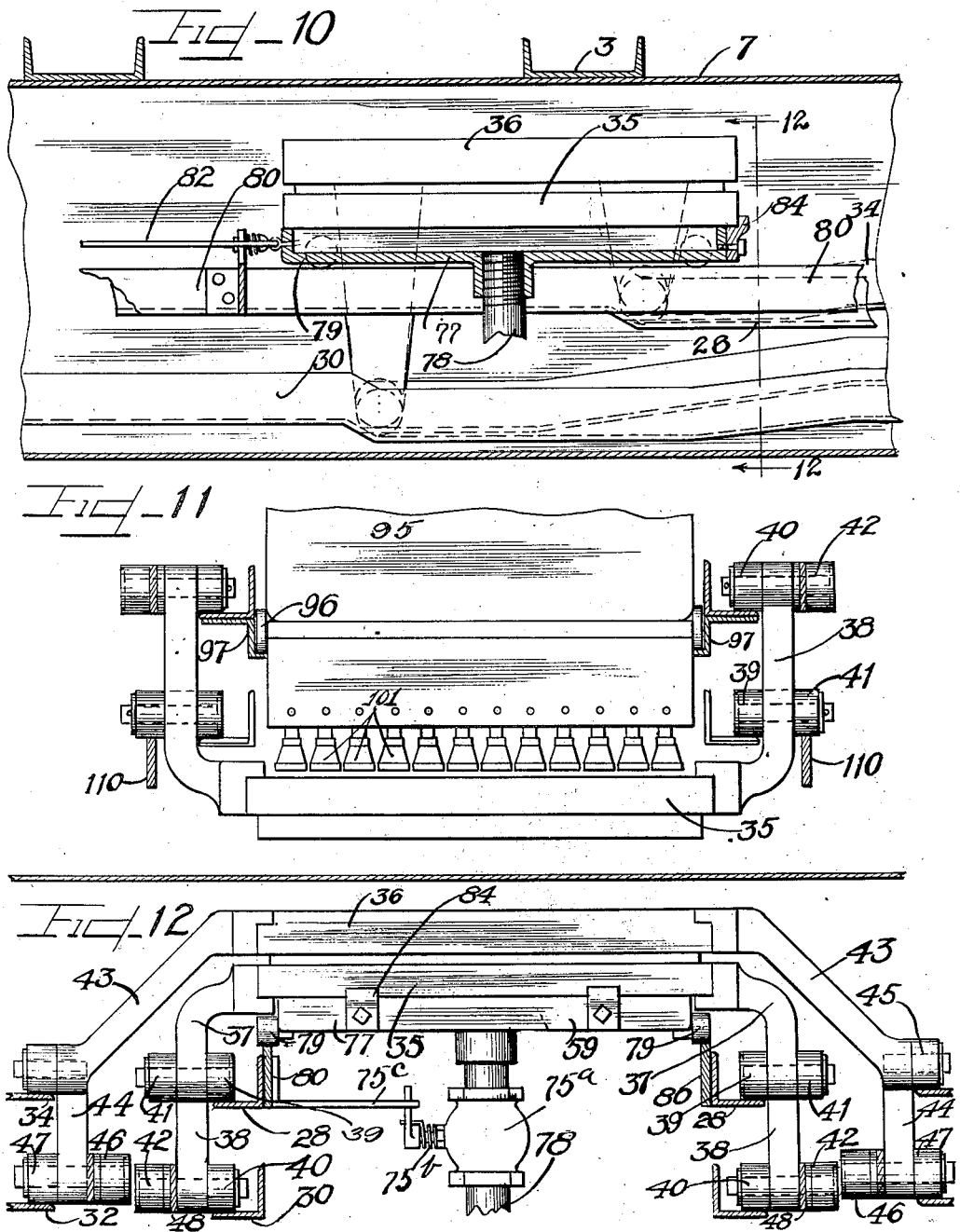

May 20, 1924.
C. T. EAID
1,494,345
CONTINUOUS PROCESS MOLDING MACHINE FOR FICTILE MATERIAL
Original Filed Oct. 6, 1919   11 Sheets-Sheet 9
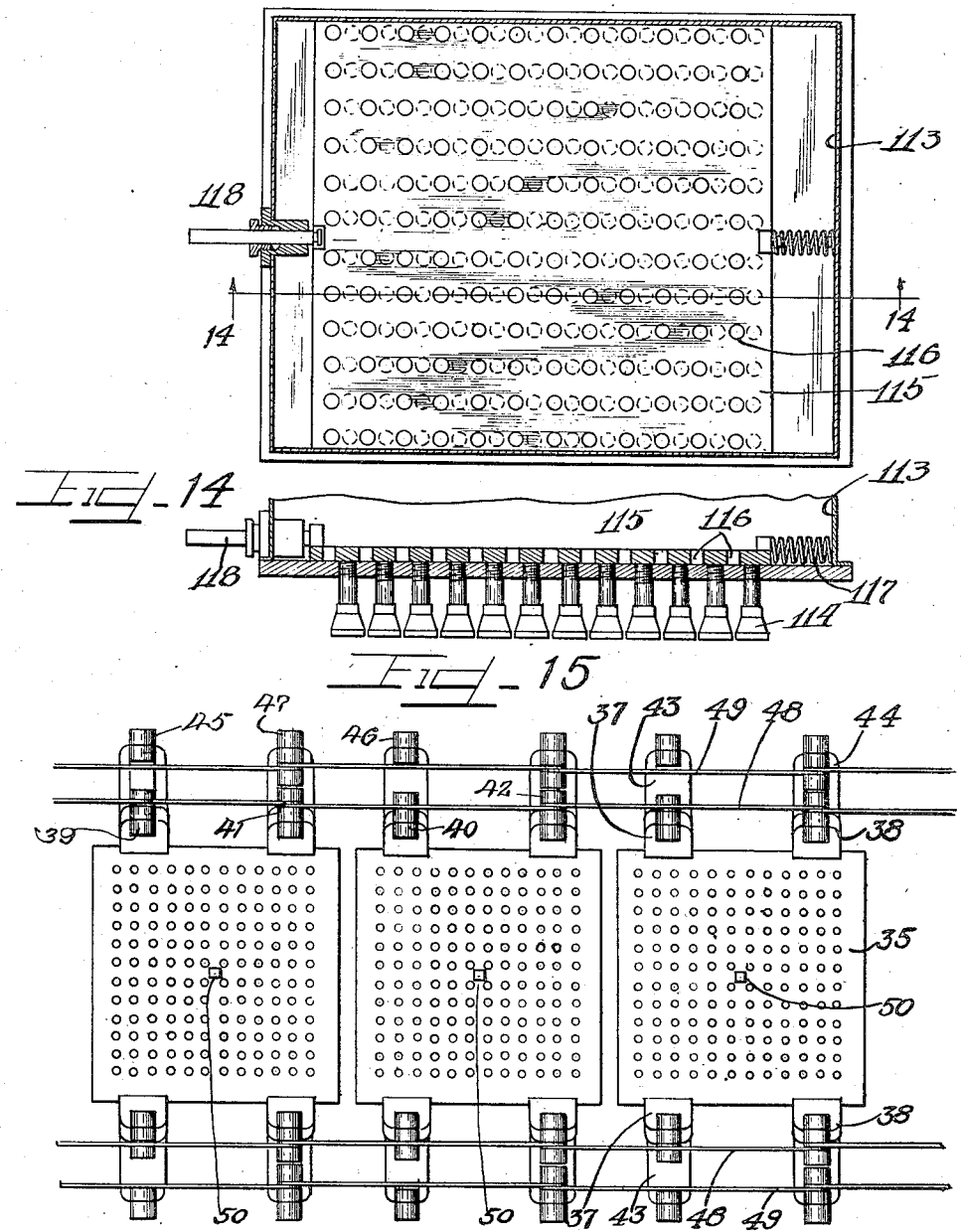

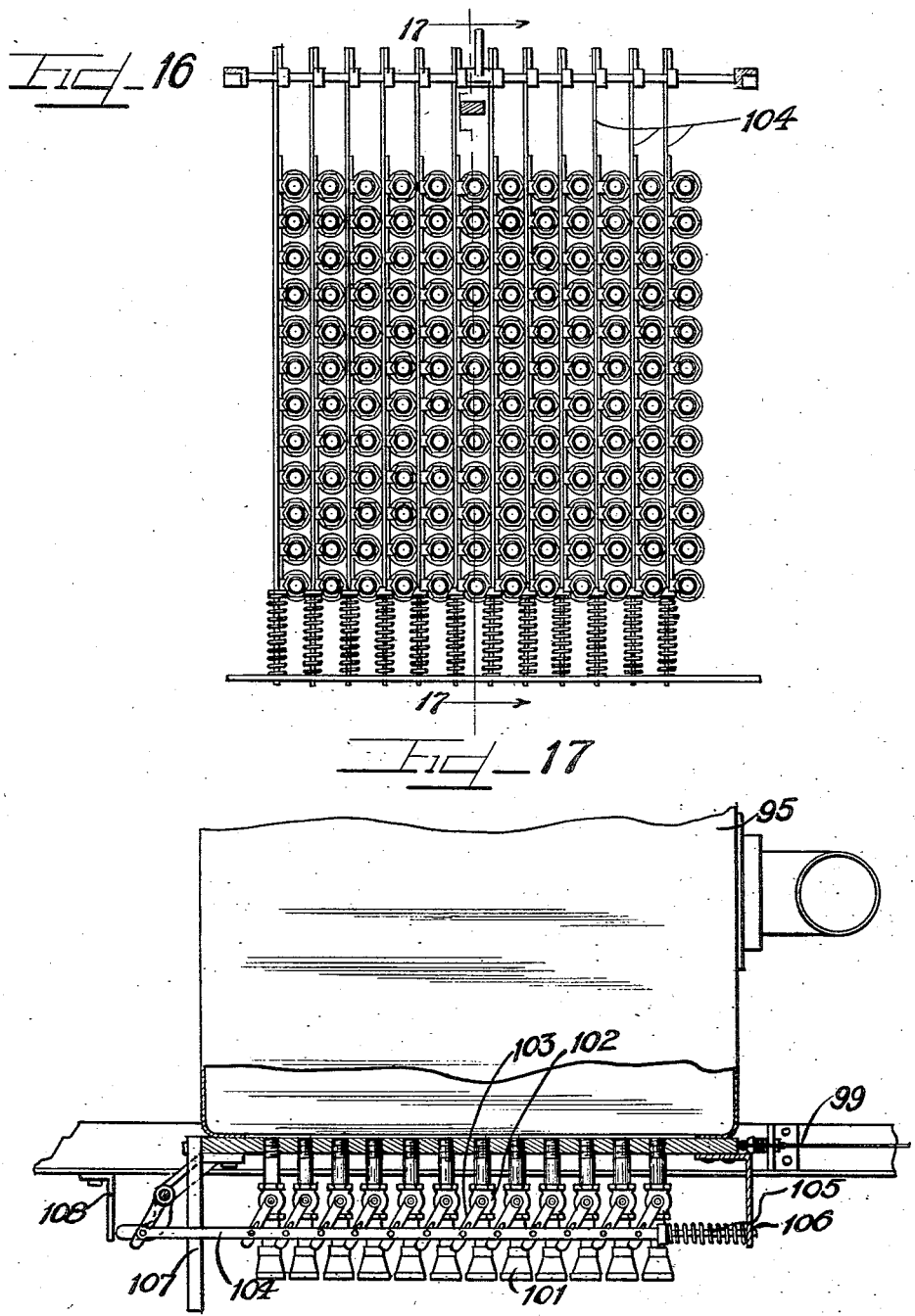

May 20, 1924.
C. T. EAID
1,494,345
CONTINUOUS PROCESS MOLDING MACHINE FOR FICTILE MATERIAL
Original Filed Oct. 6, 1919   11 Sheets-Sheet 11
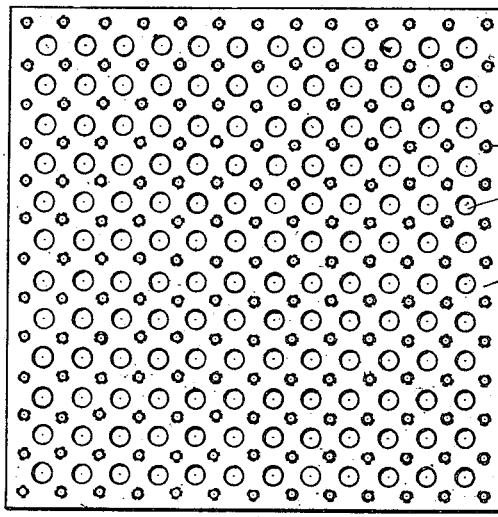
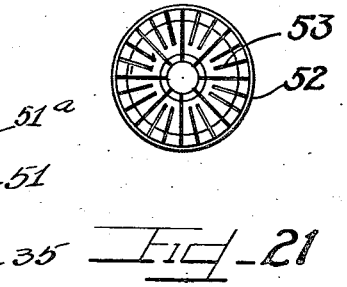
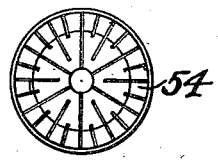
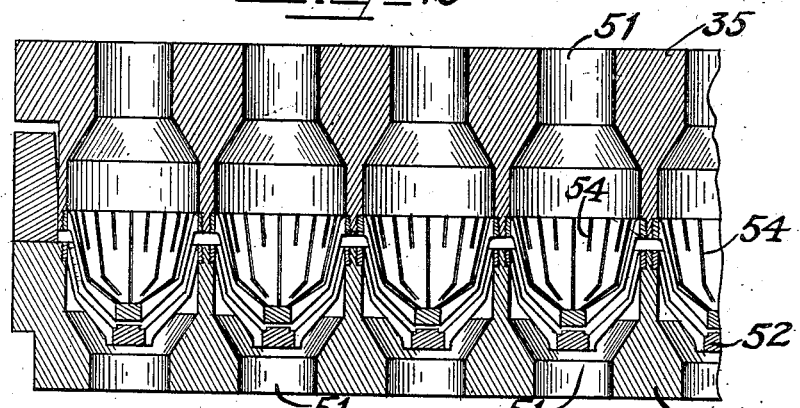
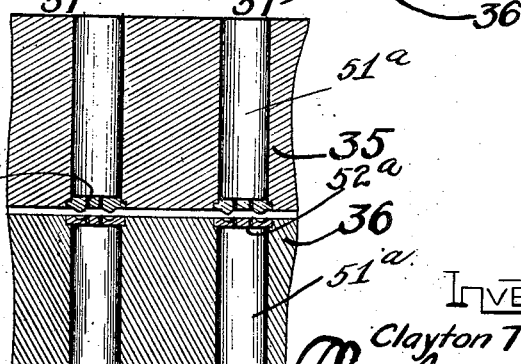
Inventor
Clayton T. Eaid Patented May 20, 1924.

1,494,345

UNITED STATES PATENT OFFICE.

CLAYTON T. EAID, OF WAUKEGAN, ILLINOIS; GRACE E. EAID, EXECUTRIX OF SAID CLAYTON T. EAID, DECEASED, ASSIGNOR OF THREE-FOURTHS TO MARION R. CUMMINGS, OF SEATTLE, WASHINGTON.

CONTINUOUS-PROCESS MOLDING MACHINE FOR FICTILE MATERIAL.

Application filed October 6, 1919, Serial No. 328,730. Renewed January 19, 1924.

*To all whom it may concern:*

Be it known that I, CLAYTON T. EAID, a citizen of the United States, and a resident of the city of Waukegan, in the county of Lake and State of Illinois, have invented certain new and useful Improvements in a Continuous-Process Molding Machine for Fictile Material; and I do hereby declare that the following is a full, clear, and exact description of the same, reference being had to the accompanying drawings, and to the numerals of reference marked thereon, which form a part of this specification.

This invention relates to that class of devices disclosed in my copending application for patent entitled "Machines for the manufacture of articles from fictile material," filed October 1st, 1917, Serial No. 194,126.

The invention relates to that class of machines which are designed to mold a plastic or fictile material, in particular a pulp material suspended in liquid, into articles of a certain configuration, and after formation of the articles in the molds or dies provided, and dehydration thereof under suction, heating the same substantially to dry condition and thereafter discharging the same to a conveyor for removal from the machine. The process is continuous and involves the use of a series of male and female mold members containing individual dies, which are connected to one another by the links of a conveyor chain which causes the molds to be drawn through the various stages of the machine so that the material is first introduced into the molds, then subjected to a dehydrating action, subsequently compressed to form, thereafter transferred from one mold member to the other and passed through a drying or heating chamber, and finally, after a further compression and dehydration between the mold members, discharged to a conveyor and removed from the machine.

The machine which operates to perform the process of manufacture necessary to produce the results desired operates entirely automatically, it only being necessary to provide a suitable source of power to drive and a supply of material from which the articles are made. The process of forming articles is continuous and there are a number of novel features of construction and operation, in the various mechanisms of the machine, to properly achieve the results desired. It is an important consideration in the manufacture of articles of the kind desired, that the articles be of substantially uniform thickness and density and this machine functions properly to produce articles of uniform quality from the pulp matter introduced into the machine.

The invention comprehends the use of male and female die members each separately connected to link members and properly guided and operated through the machine coincidently and in proper synchronism whereby the formative movements of the mold members, which involves an approach and recedence thereof relative one another, is truly reciprocal and is effected without cessation in the progressive movement of the members through the machine.

It is an object, therefore, of the invention to provide a machine which in the course of its operation performs a complete process from its initial to its final stages, thereby producing a series of articles of substantially the same contour, dimension and quality as a finished product from a viscous or fictile material introduced into the machine.

It is also an object of this invention to provide a machine for effecting the various steps in the several stages of a process to produce a completed product from the raw material introduced into the machine, and involving the use of continuously moving mold or die members which pass through various process stages while progressing through the machine.

It is also an object of this invention to provide a machine for forming articles from a viscous mass, in particular pulp material in suspension wherein certain of the mold members are submerged in the vat of the material and thereafter elevated therefrom in horizontal relation, and after removal from the vat, are subjected to a dehydration effect by suction and subsequently are brought into close and registering relation with complementary members and together therewith are inverted and pass into the field of operation of a suction means operating on one or both of the members to effect further dehydration of the articles, and with a separation of the members then occurring to effect a transfer of the articles from one die member to the other and with said members in separated relation, then passed through a heating chamber to dehydrate the articles by a drying heat and thereafter again compressing the articles between the mold-members, and with the final separation of the mold members, the articles remaining upon the uppermost and moving toward a point of discharge coincidently with the movement of the lowermost members into submerged relation in the vat, the uppermost members being subjected to a pressure effect at the instant of arrival of the same over a conveyor onto which the formed articles are discharged and carried from the machine.

It is a further object of the invention to provide a molding machine utilizing complementary mold members each carrying dies which are interchangeable between the mold members to permit the steps in the process to be varied if desired, so as to cause formation and subsequent treatment of the articles on either of the complementary mold members.

Other and further important objects of this invention will be apparent from the disclosures in the drawings and specification.

The invention (in a preferred form) is illustrated in the drawings and hereinafter more fully described.

Drawings.

Figure 1 is a top plan view of a machine embodying the principles of my invention.

Figure 2 is a side elevation thereof.

Figure 3 is an enlarged fragmentary interior elevation of one end of the machine with parts in section and parts in elevation.

Figure 4 is a similar view of a portion of the machine next adjoining.

Figure 5 is a similar view of that portion of the machine adjoining the portion shown in Figure 4.

Figure 6 is a view similar to Figure 3 of the machine at its opposite end or that portion adjoining the portion of the machine shown in Figure 5.

Figure 7 is a transverse section taken through the machine substantially on line 7—7 of Figure 3, but with parts omitted and parts shown in elevation.

Figure 8 is a central vertical section taken through the machine substantially on line 8—8 of Figure 4, with parts omitted and parts shown in elevation.

Figure 9 is a detail vertical section with parts in elevation substantially on the line 9—9 of Figure 3.

Figure 10 is a detail view partly in section showing the application of the mold or die members upon a vacuum pan prior to the instant of separation of the mold members, and movement into the heating chamber.

Figure 11 is a detail view partly in section and partly in elevation taken on the line 11—11 of Figure 5.

Figure 12 is a detail view with parts in elevation and parts in section taken on line 12—12 of Figure 10.

Figure 13 is an interior plan view of a modified type of pressure pan showing a grid type closure for the pressure nozzles.

Figure 14 is a fragmentary sectional view with parts in elevation taken on line 14—14 of Figure 13.

Figure 15 is a fragmentary bottom plan view showing a series of mold or die members in their linked relation for travel through the machine.

Figure 16 is an interior plan view of the pressure nozzles which are used with the pressure tank of the machine.

Figure 17 is a sectional view with parts in elevation taken on line 17—17 of Figure 16 showing the operating mechanism for the valves for the pressure nozzles.

Figure 18 is a top plan view of one of the mold or die members.

Figure 19 is a fragmentary vertical section taken through the complementary male and female molding members properly registered with one another.

Figure 20 is an interior view of one of the female die elements of a mold member.

Figure 21 is an end view of one of the male elements of a die member.

Figure 22 is a fragmentary detail section through two registered mold members.

Figure 23 is a detail view partly in section showing a vacuum pan.

Description.

Referring to Figures 1 and 2, the general construction of the machine involves the use of longitudinal frame members 1 affording a base for a plurality of uprights 2, which are connected on each side of the machine by transverse top members 3, and at each end of the machine having frame uprights 4 and 5 respectively. The mechanisms of the machine at each end are entirely enclosed by a housing 6 and the upper and lower runs of the conveyor, the guide mechanisms, and the other parts of the machine are enclosed within housings which are denoted respectively by the reference numerals 7 and 8. A drive shaft 9 is journalled in bearings 10, along one side of the machine and is provided with a belt pulley 11, around which a driving belt 12 is trained. Said drive shaft is provided with worms 13 meshing with large worm wheels 14 secured upon one end of each of the shafts 15 and 23, which are journalled transversely through the machine in the end upright members 4 and 5 respectively. Said shaft 9 is also provided with another belt pulley having a belt 16 trained therearound, which is also trained around a pulley on a shaft supported in bearings 17 and carrying a driving roller for a belt conveyor 18, which extends transversely through the machine, as shown clearly in Figures 1 and 2.

Referring to Figures 3 and 7, it will be seen that the driving shaft 15, which extends transversely through one end of the machine, has secured thereon within the housing 6, a pair of quadrangular spider wheels 19 near each end of the shaft, and a central wheel 20 of greater diameter than the quadrangular spiders 19. At the corners of each of the quadrangular spiders 19, the arms thereof are recessed as at 21, and beyond each of the four arms of the wheel 20, projecting lugs 22 are provided on the periphery of said wheel. As will be hereinafter pointed out, the quadrangular spiders 19 serve to engage the points of pivotal connection of the links for the mold members and the lugs 22 of the central wheel 20 serve to engage the innermost of the assembled mold members in effecting a drive thereto and to the succession of mold members attached to the conveyor chain of the machine.

Similarly at the opposite end of the machine, as shown fragmentarily in Figure 6, the transverse shaft 23 has secured thereto a pair of quadrangular spiders 24 and a central wheel 25, and said spiders and wheel are similar in construction to the spiders 19 and wheel 20, described. However, the particular shape and construction of the spiders and wheels shown is not essential to the operation of the machine and may be varied to a wide extent without departing from the principles of my invention. Symmetrically supported within the housings 6 are a pair of semicircular angle bar tracks 26 of slightly less diameter than the central wheel 20, and the track 26 registers at its lower end with a track 33, and at its upper end with a track 34. Similarly the points of extreme diameter of the quadrangular spiders 19 are adapted to register with lower tracks 31 and upper tracks 32. The tracks 31 and 32 are spaced inwardly from the respective tracks 33 and 34 and each of the respective tracks mentioned is bent out of a continuous path at various points in its length, as will be hereinafter pointed out, the purpose and necessity of which will appear from further description.

It will be seen that Figures 3, 4, 5 and 6 respectively form a series of substantially connected views which illustrate an interior view of the machine from end to end, in particular those portions in which the stages in the operation of the process are performed. The track members 31, 32, 33 and 34 respectively, which are provided in pairs, that is, are duplicated on each side of the machine, are for the female mold members, which are, as shown, always the outer members in the series of connected mold members, and other tracks, also duplicated on each side of the machine, are provided for the male or inner mold members, for guidance thereof through the machine. The latter tracks are shown more clearly in Figure 8 in section and are denoted by the reference numerals 27, 28, 29 and 30, respectively.

The inner or male mold members are denoted as a whole by the reference numeral 35, and the outer or female members are denoted as a whole by the reference numeral 36. Each of the mold members 35 is provided with a pair of short arms on each side at the forward end, denoted by the reference numerals 37 and with a pair of long arms 38 at the other end thereof. (See Fig. 15.) The purpose of using arms of different lengths to support the mold members is to permit the use of different tracks for sets of rollers 39—41, and 40—42, on the respective arms which insure a mold member remaining horizontal in all its vertical displacement movements which occur for certain purposes during the progress of the mold member through the machine. The rollers 39 and 40 are on the inner side of the respective arms and the other pair of rollers 41 and 42 respectively are disposed on the outer side of the respective arms of the mold member.

Similarly the female or outer members 36 are provided with short arms 43 and long arms 44 and each of the short arms 43 is provided with a roller 45 and each of the long arms is provided with an inner roller 46 and an outer roller 47. The respective arms and rollers for the mold members described are shown clearly in Figures 7, 8, 12 and 15. The respective inner and outer mold members 35 and 36 are connected in series with other like members in the manner shown in Figures 3 and 15, that is to say, links 48 are connected between the long arms 38 of the mold members 35, and links 49 are similarly connected between the long arms 43 of the mold members 36, but no links are provided between the short arms of the mold members. As shown clearly in Figure 7, the inner rollers 46 of the long arm members 44 of the outer molds 36, and the outer rollers 42 of the long arm members of the inner mold members engage into the recessed portions 21 of the quadrangular spiders 19 with the links 48 and 49 disposed in angular relation therebetween, as clearly shown in Figure 3, when the mold members are carried around the shaft 15 at the forward end of the machine.

As clearly shown in Figure 15, each of the inner mold members 35 on its back surface is provided with a recess 50, which is adapted to engage with one of the lugs 22 on the wheels 20 and 25 as the molds are carried around at the ends of the machine.

When the assembled mold members 35 and 36 are carried around on the wheels 20 and 25 at the ends of the machine, an intense pressure effect is transmitted between the mold members owing to the fact that the inner male die mold is thrust outwardly by the wheel 20 or 25 and the outer female mold member is confined by its track 26 and arms which are linked to the conveyor chain, from outward movement. The construction of the molds is shown in Figures 18 to 22 inclusive.

The outer mold member 36 has a plurality of cup-shaped apertures extending entirely therethrough, spaced symmetrically and denoted by the reference numerals 51. Threaded into a recessed portion on the inner surface of the mold member at each of the cup-shaped recesses 51 are die elements 52, which may be preferably of light metal having a plurality of slots 53 therein and said die elements are of a contour which is desired for the actual outer shape of the article to be formed.

The inner or male mold members 35 are of a similar construction, also having cup apertures 51 therethrough and with the die elements 54 threaded thereinto but projecting outwardly therefrom instead of inwardly as in the mold members 36, and said elements 54 are likewise of light metal construction and provided with a plurality of slots and are formed to a shape corresponding to the contour desired for the interior of the article to be formed and are substantially complemental with the elements 52 when the mold member 35 registers over the mold member 36.

Both the male and female molds 35 and 36 are provided with passages 51ª therethrough intermediate the die recesses 51, and at the die surfaces are provided with apertured or slotted complementary dies 54ª and 52ª respectively.

Disposed within the lower portion of the housing section 8 of the machine is a supply vat 55, shown in Figures 4 and 5, for the pulp liquor and into which the outer or female molds 36 are submerged in order to fill the dies with the material to be formed into articles.

Said vat 55 is continually supplied with pulp liquor by means of any suitable supply line 56, shown in Figure 8, and heating coils 57 are provided on the interior of the vat.

As shown clearly in Figure 4, the initial steps in the process are begun when the outer or female mold members 36 are submerged in the vat 55 of the pulp liquor. The respective tracks 31 and 33, which support the mold members, are parallel for that portion of their length of which the mold members are caused to move in submerged condition in the vat. Furthermore, the track is of channel section to confine the rollers therein against displacement due to draft on the chain links. Both of said tracks are angled upwardly at different points toward the forward end of the vat, as clearly shown, so that the mold members, as they progress toward the forward end of the vat, are elevated therefrom, yet at all times preserving a true horizontal position so that the material is not spilled therefrom.

The mold members 36 are submerged for a period of time in the vat 55, to insure that the dies are filled with sufficient pulp material necessary to proper formation of the articles. The inclined portions of the respective tracks 31 and 33 are denoted respectively by the reference numerals 58 and 59. Also the respective tracks 27 and 29 incline downwardly, as denoted by the reference numerals 60 and 61 respectively, as shown in Figure 4, on which the male mold members 35 are supported substantially at the same point as the upwardly inclined portions 58 and 59 of the supporting tracks 31 and 33 for the female mold members, thus causing an approach of the male and female mold members toward one another. The position of the inclined portions of the respective tracks 27 and 29 is such with respect to the inclination of the respective tracks 31 and 33 that the mold members are brought into parallel relation with a true reciprocal movement. The track members 31 and 33 continue for a short distance in straight parallel relation, and then are offset downwardly, as indicated by the reference numeral 68. Downward movement of the rollers 47 supporting the arms 44 of the mold members 36 is achieved by the use of confining tracks 74, beneath which the respective rollers are caused to track. The position of the confining track bars 74 may be changed by means of jack screws 76, pivotally mounted on the frame work 1 of the machine.

The purpose of the downwardly offset track portions 68 is to cause lowering of the mold member 36 into co-active relation with a suction mechanism to dehydrate the material, to a certain extent, carried in the mold.

For this purpose a vacuum pan, shown in dotted lines in Figure 3 and denoted by the reference numeral 65, is provided which is mounted on suitable rollers (not shown) and is similar to the construction of another vacuum pan shown in detail in Figs. 10 and 12. The vacuum pan communicates with a stationary vacuum reservoir tank 75, by means of a flexible tube 78 and through a valve 75ª which is mounted on and beneath the vacuum pan. The handle for operating said valve is provided with a spring 75ᵇ as shown in Figure 12, operating normally to open the valve. The handle, however, is normally held in closed position by a stop 75ᶜ against which the handle contacts as the vacuum pan moves into initial position after displacement. The rollers of the vacuum pan are adapted to roll on tracks to permit a forward movement of the vacuum pan 65 with the mold member 36. An upwardly projecting lug 67, is provided on the forward end of the vacuum pan, which is adapted to be contacted by the forward end of the mold 36, when it is lowered by the downwardly offset portions 68 of the respective supporting tracks 31 and 33, thus causing the mold member to fit closely over and register with the vacuum pan 65. The vacuum pan 65 is then moved along forwardly with the mold. The forward movement of the vacuum pan 65 is resisted by a weight 69, suspended by a cable 70, which is trained around a stationary pulley 71 mounted on the frame of the machine and also around a movable pulley 72, with the end of the cable attached to the bearing for the pulley 71. The movable pulley 72 is provided with a cable 73, which is trained around a suitable guide pulley and attached to the rear end of the vacuum pan 65, so that with a forward movement of the vacuum pan the weight 69 is elevated. When the mold member 36 is elevated due to the supporting rollers moving upwardly at the end of the downwardly offset track portions 68, the lug 67 of the vacuum pan is released permitting the counter weight 69 to return the vacuum pan to initial position. To prevent sudden impact of any vacuum pan on its return to initial position, a slidable rod 64 is provided in a cross frame member 64ª and having a compression spring 64ᵇ therearound. The vacuum pan strikes the head of the rod on its return and is brought yieldably to rest. (See Fig. 23.) Before the mold member 36 moves upwardly from the offset portions of its supporting track, and out of engagement with the vacuum pan, it registers with its complemental male mold member 35, which is forced downwardly in offset portions of its tracks by confining tracks into close relation with the female member under pressure.

The mold members are maintained in closed relation during the remainder of the dehydration effect by the vacuum pan and are then elevated therefrom by their respective tracks, however maintaining their closed relation and with the confining tracks 74 for the upper male mold holding the same downwardly under pressure into the lower female mold.

The two mold members move upwardly out of their respective offsets simultaneously and the rollers of the upper or male mold 35, then pass beneath tracks 74 adjustable by jack screws 76 which force the upper mold under pressure downwardly on the lower. After passing from beneath the confining tracks 74, the respective mold members 35 and 36, move onward along the respective tracks 29—27, 31—33. The mold members finally reach the wheel 20 and quadrangular spiders 19 and one of the lugs 22 on the wheel engages into the recess 50 provided therefor in the back surface of the inner mold member 35, and the outer rollers 45 on the short arms 43 of the outer mold member 36, engage within the semi-circular track 26, thereby confining the associated mold members to a path of movement conforming to the tracks 26. Furthermore, the adjacent rollers 42 and 46 on the ends of the respective long arms 38 and 44 of the mold members, engage into the recesses 21 of the quadrangular spiders 19, with the connecting links 48 and 49 disposed therebetween, the links 49 being clearly shown in such position in Figure 3. Thus the linked associated mold members 35 and 36 are carried around, as clearly shown in Figure 3, from the lower track members in the housing to the upper track members. The diameter of the wheel 20 is such with respect to the confining means for the outer mold 36, that the inner mold 35, is held thrust outwardly thereagainst by the wheel 20 which has bearing contact with the inner mold 35 at its middle portion or recess 50. Upon passing from the spiders 19 and wheel 20, in inverted position, the rollers on the short arms 43 of the outer mold members 36, move on to the tracks 34, the rollers 47 on the long arms 44 move on to the tracks 32, the rollers 39 of the short arms of the mold members 35 move onto the tracks 29, and the rollers 40 of the long arms 37 move onto the tracks 30.

The next effect which is imposed upon the travelling mold members with their contents after passage over the wheel and spiders at the forward end of the machine, is a suction or dehydrating effect transmitted, this time, through the inner or male member of the molds. For this purpose a vacuum pan shown in Figures 3, 10 and 12 and denoted by the reference number 77 is provided, having an automatic valve 75 and stop and flexible pipe connection 78 as in the preceding construction, communicating with a reservoir 77ª, and supported by rollers 79 upon tracks 80. The vacuum pan is normally held in a forward position by means of a counterweight 81 attached to a cable 82 which is trained around a stationary pulley 83 and at its end is attached to one end of the vacuum pan as shown clearly in Figure 10. Said vacuum pan is provided with a pair of upwardly projecting lugs 84 which are contacted by the forward edge of the inner mold member 35 as shown in Figure 10, when the mold member moves into registering relation with the vacuum pan, and thereafter the vacuum pan is caused to move along with the mold member, thereby elevating the weight 81. A suitable resilient stop mechanism, identical with that described, is provided for the vacuum pan 77 after release by the mold member and when moving forward under the influence of its counterweight 81. At the time that the dehydrating effect is first imposed upon a male mold 35 by the vacuum pan 77 the respective molds 35 and 36 are in close registering relation.

Just prior to the completion of the dehydrating effect by the vacuum pan 77, the respective tracks for the mold members are so angled as to cause separation of the mold members and the suction effect upon the male or inner mold member 35 serves to retain the formed article on this mold member. The separated mold members still in registered relation continue through the machine passing through the housing portion 7 where an additional step in the process takes place. That is to say, at this stage the articles on the mold member 35 are subjected to a heating effect to complete the dehydration, drying the articles and causing a "set" in the same, so that the articles may be readily removed from the molds and are ready for the use intended. The drying and heating stage serves further to cause the paraffin or coating of other material which may be used on the dies prior to formation of articles therein, to impregnate the article thereby waterproofing the same and giving the articles a hard glazed surface both on their inner and outer faces.

The heating effect in the housing 7 of the machine is obtained by the use of a plurality of burners 85 connected to main supply lines 86, shown in detail in Figures 4 and 8. Perforated pipes 7ª are provided in the oven or heating stage of the machine and are connected to any suitable suction means so as to withdraw the steam, vapor, and excess moisture from the oven and facilitate drying of the material.

After passage of the mold members through the heating chamber or housing 7, the respective tracks are angled in such a manner as to bring the mold members again into closed registering relation for passage around the quadrangular spiders 24 and wheels 25 at the rear end of the machine. After the assembled mold members have passed around the spiders 24 and wheels 25 in closed pressure relation at the rear end of the machine the respective rollers on the arms of said mold members again engage the proper tracks therefor in the lower portion of the machine housing.

After the mold members have passed around the spiders and wheel at the rear end of the machine and have been transferred from the upper run to the lower run of the machine, a further stage in the operation of the process takes place. That is to say, the tracks for the respective mold members are offset so that the inner or male mold members are subjected to a suction effect while the molds are in closed relation, and then the tracks for the rollers of the lower or female molds are angled downwardly so that a separation of the molds takes place, that is, the outer or lower female mold is moved downwardly from the male mold while the male mold is still under the suction effect so that the formed articles are retained upon the male mold.

For this purpose a vacuum pan is provided having an automatic valve 75 and flexible pipe connection 88 to a vacuum reservoir 88ª. The pan is mounted in a similar manner to the vacuum pans previously described, upon rollers which roll upon tracks 89 provided for the purpose. Also counter weight 90 is provided attached to a cable 91 trained over a stationary pulley 92 and around another stationary pulley 93 with the end of the cable attached to one end of the vacuum pan 87, and tending to retain the vacuum pan in a rearward position. Furthermore a resilient stop mechanism for the pan such as shown in Figure 10 for the pan 77 is provided. The respective tracks for the mold members are so angled at the point of registration of the male mold members with the normal or initial position of the vacuum pan that the forward end of a mold member engages a lug 94 on the forward end of the vacuum pan and thereby moves the vacuum pan with the mold member. Immediately thereafter the angularity of the respective tracks for the male mold members is such that a separation of the mold members takes place but with the inner male mold member maintaining its connection with the vacuum pan so that the articles formed between the mold members, are retained upon the male mold member as the female mold member is moved therefrom. The mold members in separated relation then continue their progression, the male mold member however, moving downwardly into released position from the vacuum pan. The female or outer mold members progress forwardly and subsequently downwardly into the vat 55 to again receive a charge of the pulp liquor to repeat the process. Prior to the submersion of the female mold members in the vat 55, the same are sprayed with a coating of paraffin or other water-proofing material and owing to the relatively hot condition of the molds the sprayed material will not harden therein. The inner or male members 35 finally move upwardly owing to the inclination of the respective tracks therefor, carrying the formed articles which adhere thereto. As shown in Figure 5, the male mold members 35 are then subjected to a further step in the process to effect removal of the formed articles therefrom and this consists in applying pressure individually to the apertures 51 in a mold member whereby the articles carried thereon are blown downwardly therefrom, and discharged.

The apparatus utilized in the operation of this step in the process consists of pressure tank 95 mounted upon rollers 96 supported on tracks 97.

As in the prior constructions provided for the vacuum pans, a counterweight mechanism is utilized to maintain the pressure tank in its initial position for registration of the nozzles thereof with a mold member. For this purpose a weight 98 is trained over a pair of pulleys 100, and leading downwardly therefrom around a guide pulley (not shown) and connected to the rear end of the tank 95. A plurality of nozzles 101 are connected into the lower wall of the tank 95 positioned for registration with the apertures 51 of the mold members 35, shown more clearly in Figures 11 and 19, and each of said nozzles 101 is provided with a valve 102 having an operating lever 103, shown in detail in Figures 16 and 17. The operating levers 103 for a series of valves are connected by a pin and slot connection to a common actuating bar 104, there being a number of bars 104, one for each series.

A coiled spring 105 is connected around each of the operating rods 104, one end thereof bearing against a downwardly extending partition or stop wall 106, and at its other end each of said rods 104 extends through an aperture in a downwardly extending partition wall 107. Said respective partition or stop walls 106 and 107 are attached to the lower wall of the tank structure 95, as shown in Figure 17. Each of the rods 104 rests normally against a stop 108, and is held thereagainst by its respective spring 105, the valves for the nozzle 101 being closed for this position of the parts as shown in Figure 17.

However, as an inner or male mold member 36 travels along into substantially registering position beneath the nozzles 101, as shown in Figure 5, the respective tracks supporting the mold member 36 are offset, as indicated by the reference numerals 109, causing the mold member to be thrust upwardly into close contact with the respective nozzles, and furthermore causing the forward end of the mold member 35 to engage with the downwardly extending partition wall 107, thereby causing the pressure tank 95 to move along with the mold member. This movement continues throughout the length of the upwardly offset portions 109 of the tracks and causes the valves 102 to be opened, inasmuch as the operating rods 104 therefor are held stationary by the stop wall 108. Forward movement of the tank 95 and its valve 102 thus causes an opening of the valves against the compression of the respective springs 105, and air under pressure is introduced into each of the apertures 51 of the mold member 35 to displace the formed articles therefrom.

After the mold member rollers have traversed the offset portions 109 of the track, the mold member is lowered thus releasing the partition wall 107 from the mold member and permitting the tank 95 to move rearwardly under the influence of its counterweight 98 and the operating rods 104 are held thrust forwardly during such rearward movement of the tank by the springs 105, thereby causing the respective valves 102 for the nozzles 101 to be closed. In order to afford a clearance for the mold members 35, when the same are moved upwardly, the supplementary tracks 110 are provided on each side of the machine, shown in Figures 5 and 11, on which the outer rolls 41 of the short arms 43 track.

When the articles are blow from the mold members 35 they are received upon the conveyor 18 hereinbefore described and are carried outwardly from the machine to a point of discharge. The mold members 35 continue their movement from the position of discharge over the conveyor 18 toward the downwardly inclined portions of the track 60 and 61 and just prior to moving downwardly thereon pass over spray pipes 111 which serve to spray the mold members in their relatively hot condition with a paraffin or waxing fluid preferably of a waterproofing character which serves largely to prevent the articles formed on the dies from adhering thereto, particularly during the heating stage and further, this waterproofing spray impregnates and is baked into the articles when passing through the heating stage, giving the articles a hard glazed surface.

In the modified structure shown in Figures 13 and 14 I have shown a vacuum pan structure utilizing separate nozzles for each die recess which may supplant any of the vacuum pans shown. It consists of a vacuum chamber or reservoir 113 provided in its bottom with a plurality of nozzles 114. The openings of said nozzles through the bottom into the reservoir chamber are normally closed by a large single closure plate 115 having apertures 116 each adapted for registration over one of the nozzles. Said plate is normally held in closed position by one or more springs 117 and is operated by a push rod 118 which holds the plate closure 115 stationary as the nozzles and chamber move along with a mold member in the manner previously described with reference to the other types of vacuum pans.

*Operation.*

Briefly described the series of operations through which the mold members are subjected in the various stages of the process to form the articles desired, are as follows:

The relatively hot female mold members 36, after being sprayed, pass through the vat 55 submerged therein to receive a charge of the pulp liquor and then travel upwardly on their respective inclined tracks, the inclined portions of which are denoted by the reference numbers 58 and 59 respectively so that the mold members are elevated from the vat. The inclination of the track portions 59 and 58 is such that the mold members 36 are elevated in horizontal position from the vat and there is no possibility of spilling the contents from the mold members. Coincident with the upward movement of the mold members 36 from the vat, the complemental male mold members 35 are moving downwardly on the inclined track portions 60 and 61 also in horizontal position having been sprayed by the pipes 111 with a waterproofing liquid. There is a true reciprocating approach between the mold members 35 and 36 and the two maintain parallel positions until they are finally brought into closed relation at a subsequent point.

Prior to complete closure of the respective mold members with one another, the female mold member 36 is subjected to a dehydrating effect by movement over and registration with the movable vacuum pan 65. The forward end of the mold 36 strikes the projection 67 on the pan at the time that the offset portion 68 of the tracks 31 and 33 receive the rollers which support the mold, so that the mold is moved downwardly and a positive downward movement is assured at this point by the confining rails of tracks 74, which are over the outer rollers 47 of the long arms 44 of the lower mold. The contact between the mold 36 and the projection 67 on the vacuum pan causes the vacuum pan to travel forwardly along with the mold during the period that the vacuum effect of the pan is exerted on the back surface of the mold and the continued forward movement of the vacuum pan causes elevation of its counter weight 69. Before the vacuum effect on the mold member is completed, the inner or male mold member is caused to move downwardly into closed relation therewith due to offsets provided in its supporting tracks. After the closed molds have moved to the ends of the offset track portions, they are elevated so that the outer mold member moves with the vacuum pan and the projection 67 of the vacuum pan is released, thus permitting the counter weight 69 to return the vacuum pan to initial position ready to engage with the next succeeding female mold.

The molds in closed relation now move toward and around the spiders 19 and central wheel 20, the adjacent rollers 42 and 46 of the corresponding long arms 38 and 44 of the mold members engaging with the recesses 21 of the spiders and the lugs 22 of the central wheel engaging in the recesses 50 provided therefor in the back surface of the inner or male molds 55. The relative diameter of the wheel 20 and confining tracks for the outer molds is such that the inner molds 35 are forced outwardly and into close pressure relation with the outer molds during their circular path of travel to the upper run of the machine. At this point the respective rollers for the mold members are introduced upon tracks for guidance thereof through the machine, there being tracks provided for each of the short arm rollers of the mold members and also tracks for the rollers on the long arms of the mold members.

The next effect to be imposed on the mold members is a dehydrating effect imposed singly on each of the inner or male mold members. The mold members in the upper run of the machine are in inverted relation to those in the lower run of the machine, and the mold members which in the lower run of the machine were the upper members, are now, in the upper run of the machine, the lower, and as such are brought into the field of operation of the vacuum pan 77. The respective tracks for the rollers of the mold members are offset and angled at different points such that the mold members in closed relation move downwardly with the innermost or male mold member 35 in registering relation over the vacuum pan 77 and the forward edge of the mold member contacts the projection 84 on the vacuum pan to cause the vacuum pan to move along with the two closed mold members, thereby elevating its counter-weight 81. The vacuum pan 77 serves to further dehydrate the articles being formed between the mold members.

The next stage in the operation is a separation of the mold members while the male member is registered with the vacuum pan, and passage thereof into a heating chamber. The respective tracks for the rollers of the mold members are accordingly properly offset and angled in diverging relation to support the mold members in separated relation after leaving the vacuum pan 77, and upon passage into the heating chamber over the burners 85. It is during the heating and drying operation that the impregnation of the material with the waterproofing substance takes place. That is the sprayed substance introduced into both of the relatively hot molds before the material is supplied therebetween, is cooked into the articles formed giving the same a hard, glazed, dry and waterproof surface. Of course, it is obvious that either of the molds may be so treated as well as both, and other means may also be devised to accomplish the result, all falling well within the principles of my invention. After passage of the mold members in separated relation through the heating chamber of the machine with the articles carried upon the male members, the mold members are again brought into closed relation prior to exit from the heating chamber, as shown in Figure 6. The respective tracks for the rollers for the respective mold members are angled and converge to an extent to bring the mold members in closed relation and the same then pass onto the spiders 24 and central wheel 25 engaging therewith in a manner already described with reference to the spiders 19 and wheel 20, and travel therearound and are inverted, and transferred to the lower run of the machine. After leaving the same the mold members are so moved by the inclination of the respective tracks as to cause the inner mold members 35 to register with a vacuum pan 87 and by engaging the projection 94 thereon moving the vacuum pan along with the assembled molds to exert a suction effect through the mold member 35.

While this operation is in progress the tracks for the respective mold members are so angled that a separation of the mold members again takes place, but the suction effect on the mold member 35 serves to retain the formed articles thereon and thereafter as the vacuum 57 is released by displacement of the mold member 35 downwardly return of the vacuum pan to initial position is effected by its counter-weight 90, and the mold members continue their progress in separated relation with the articles preferably on the inner members. The lower mold members 36 move toward the vat 55 and the upper or inner mold members 35 carrying the articles move upwardly on their inclined tracks toward the point of discharge.

The upper mold members 35 move finally into registering position beneath a plurality of nozzles 101 communicating with the pressure tank 95 and upon registering therewith the pressure tank is caused to move along with the mold member 35 due to engagement of the forward end of the mold member with the downwardly extending wall 107 of the tank structure. This movement causes the operating rods 104 for the valves 102 of said nozzles to be held stationary as the valves are moved with the tank, causing the valves to open and permit a pressure effect to be exerted through each of the apertures 51 in the mold member by the nozzle 101 to blow the formed articles on to the conveyor 18 for discharge from the machine.

After the articles have been discharged from the male mold member 35, offset portions of the tracks cause downward displacement of the mold members from the nozzles 101, thereby releasing the projecting wall 107 from engagement with the mold member and permitting the counter-weight 98 to return the pressure tank 95 to initial position. This retractive movement of the pressure tank also serves to cause closure of the respective valves 102, inasmuch as the operating rods 104 therefor are held stationary by the compression of the respective springs 105.

It is obvious that there are many ways and means of handling the molds to perform the results desired all within the scope of my invention.

The molds may be vertically positioned and given a relative reciprocative movement and a continuous forward movement, or may have a double reciprocative movement that is forward and back and to and from one another. Furthermore, in the discharge of the formed articles it is possible for the molds carrying the articles to register and move with trays to which the articles may be transferred and then by release of the trays to a conveyor mechanism, permit the same with the articles to be operated through further stages in the process.

Furthermore, it is possible to dispense with one of two complementary molds and give form to the articles by suction or pressure effects or both properly applied to the material on one mold member.

I am aware that numerous details of construction may be varied through a wide range without departing from the principles of this invention, and I therefore do not purpose limiting the patent granted otherwise than necessitated by the prior art.

Claims.

1. In a machine of the class described a series of connected male and female mold members, means supplying material to be molded to one of said mold members, means for dehydrating the material through first one and then the other of said mold members, and heating means for applying drying heat to the articles formed from said material on one of the mold members.

2. In a machine of the class described a series of mold members having linked connection with one another, means for submerging a mold member into a supply of material to be molded and lowering and elevating said mold member in horizontal position to prevent spilling of material, said mold members consisting of male and female elements, separate guiding means for each thereof, means causing the same to approach and recede from one another in parallel relation at different points in the machine, means on both of said elements to utilize suction effect for dehydrating the material thereon, and offset portions in the guiding means to cause an approach of a mold element to the suction means and a recedence therefrom prior to and after the suction effect is imposed upon the element.

3. In a machine of the class described, mold members adapted to compress material therebetween to form articles therefrom, mechanisms affording a reciprocal movement of approach and recedence to the respective mold members coincident with a continuous forward travel thereof, means exerting a dehydration effect through first one of said mold members and then the other thereof on the material being formed, means supplying heat to the articles formed from the material while on a mold member, means effecting transfer of the article thereafter to another mold member and mechanism causing ejection of the formed article therefrom.

4. In a machine of the class described complementary mold members, means causing a continuous advance thereof and from time to time an approach and recedent movement between the mold members to compress material therebetween and form articles therefrom, means subjecting the material to a dehydrating effect while on one member and subsequently to another dehydrating effect while on another member, means heating the formed material while carried on one mold member, mechanisms effecting transfer by suction to the other mold member and a pressure effect for displacing the formed articles therefrom for discharge from the machine.

5. A machine of the class described comprising a series of male and female mold members each respectively forming a part of a continuous linked series, rotatable mechanism within the machine around which said respective linked series are trained to form an upper and lower run of the series of connected mold members within the machine, means supplying material to one of the mold members in the lower run of the machine, means imposing a dehydrating effect upon the material at points in the lower and upper runs of the machine, a heating effect imposed upon the formed material on one of the series of mold members in one of the runs of the machine and means displacing the formed articles from the mold members for discharge from the machine.

6. In a machine of the class described a plurality of complementary mold members with similar members linked together to form a continuous series, means continually advancing both of said series and at various points causing a reciprocation between the complementary members into parallel relation to compress material into shape therebetween, dehydrating means for co-acting with the respective mold members, movable with said mold members while imposing a dehydrating effect on the material thereon, and means for drying the formed material on certain of the mold members and prior to discharge therefrom.

7. In a machine of the class described a plurality of complementary mold members comprising male and female elements, said male elements connected in linked relation to one another to form a continuous series and each adapted for co-action with a particular female element, means insuring true registration and reciprocating movement in parallel relation between a pair of said complementary mold members at certain points within the machine and means for imposing a dehydrating and pressure effect upon the material carried by the mold members, said means movable with the mold members during the co-action thereof with said means.

8. In a machine of the class described a plurality of female mold members linked to one another, a plurality of male mold members linked to one another, driving means for said respective mold members to form a continuous passage thereof through the machine, said driving means disposed to cause a complete reversal of said mold members when in registered engaged relation, and means causing a reciprocation of said respective male and female mold members relative to one another with a movement of parallel approach and recedence in different stages of operation on the material molded therebetween.

9. A molding machine to form articles from material, comprising a plurality of linked female mold members to receive material therein, a plurality of linked male members for co-action therewith and advance synchronously through the machine, guiding means causing a parallel approach and recedence of said respective male and female mold members at different points in the travel thereof through the machine, means inverting said mold members when in closed relation with one another, means dehydrating the material formed therebetween, and means effecting transfer of the articles from the female mold members to the male mold members for discharge thereof from the machine.

10. In a molding machine of the class described, a plurality of female mold members linked to one another, a plurality of complementary male mold members linked to one another to advance synchronously with said female mold members through the machine, mechanisms supplying the material to be formed on one series of said mold members, mechanisms causing a parallel movement of approach and recedence between said respective complementary mold members, means inverting the mold members during the progress thereof through the machine, and means for dehydrating the material being formed at different stages and with different effects on said material during the progress of the mold members through the machine.

11. In a molding machine of the class described a plurality of complementary mold members to receive a material for the formation of articles therebetween, mechanisms applying a dehydrating effect upon the material through both of the said mold members, means inverting said mold members during the progress thereof through the machine, heating means for the material formed by said mold members, and a continuous drive for the machine to cause a continuous movement of the mold members through the machine.

12. In a machine of the class described the combination of two series of dies movable in cycles, of means for confining pairs of individual dies in operative molding contact during a predetermined part of the cycles of serial movement and means for separating said dies while moving in horizontal direction and means for applying drying heat to the dies during said separation.

13. In a machine of the class described a plurality of complementary dies arranged in two linked series and each having a predetermined cycle of movement, means causing a reciprocation between a pair of individual complementary dies at certain points in the cycle to compress a material therebetween, mechanisms movable with said dies at different points in the cycle of movement to impose dehydrating effects upon the material, means applying a drying heat to the material with said dies in separated relation, and means removing the material from the dies for discharge from the machine.

14. In a machine of the class described a plurality of molding dies linked together to form two separate complete linked series and one series of linked dies movable through the machine in synchronism with the other, means supplying material to be formed to one of said series of dies, and means causing transfer of the formed material within the machine to the other of said dies prior to discharge from the machine.

15. In a machine of the class described a plurality of complementary dies, the dies of the one complement linked together to form a continuous series, and the dies of the other complement linked together to form a separate continuous series, means insuring synchronous movement of said dies through the machine and at points therein causing reciprocal movement between pairs of individual dies with true parallel movement of reciprocation, mechanisms imparting a dehydrating effect first on the material through one of said die complements and then through the other thereof, means causing a separation of said dies for application of heat to the material carried on one thereof, and means insuring retainment of the material on certain of said dies after inversion thereof for discharge from the machine.

16. In a machine of the class described a plurality of complemental mold members linked together in two complete, continuous series, and means moving the same through a complete cycle with each mold member of a series continuously adjacent to its complemental mold member of the other series.

17. In a machine of the class described a plurality of mold members each forming a unit in one of two complete continuous linked series, and means moving the same through the machine in a continuous cycle and maintaining a parallel relation between each pair of complemental male and female members throughout the cycle.

18. A machine of the class described comprising a plurality of mold members linked to one another to form a continuous series, a plurality of complemental mold members also linked to one another to form a continuous series, and means for operating said respective series through the machine to maintain a parallel relation between each of a pair of complemental mold members of the two series.

19. In a machine of the class described mold members complemental with one another, each adapted to be moved in a complete cycle through the machine and at all times maintaining a substantially parallel relation with one another, means effecting reciprocation between said mold members, means supplying material therebetween to be pressed into form, mechanism for dehydrating and drying the material as it is formed, and means effecting a discharge of the formed material from the machine.

20. In a molding machine of the class described molds movable through the machine, mechanism effecting reciprocation and maintaining parallel relation therebetween, means continuously moving said mold members, means supplying material thereto to be formed, mechanism dehydrating and drying the same, means effecting transfer of the material from one member to the other while in the machine, and means effecting a discharge of the formed material.

21. In a machine of the class described a series of link connected mold members, means supplying material to be molded to one of said mold members, vacuum means for dehydrating the material through first one and then the other of said mold members, and means for applying drying heat to the articles formed from said mateial.

22. In a machine of the class described a series of mold members having linked connection with one another, means filling a mold member from a supply of material to be molded and maintaining said mold member in horizontal position to prevent spilling of the material, said mold members consisting of male and female elements, and guiding means for each thereof, means causing the same to approach and recede from one another in parallel relation at different points in the machine.

23. In a machine of the class described, mold members, means supplying waterproofing material thereto, mechanisms causing a reciprocal movement of approach and recedence of the respective mold members coincident with a continuous forward travel thereof, means supplying heat to the articles formed from a material while on a mold member, and to impregnate the articles with the waterproofing material, means effecting transfer of the articles thereafter to another mold member, and mechanism causing ejection of the formed articles therefrom.

24. In a machine of the class described complementary mold members, means causing advance thereof and an approach and recedent movement therebetween to compress material and form articles therefrom, means supplying waterproofing material to a mold member, means subjecting the material to a dehydrating effect while on another member, means heating the formed material while carried on one mold member to dry and impregnate the articles with the waterproofing material, mechanisms effecting transfer by suction to the other mold member, and a pressure effect for displacing the formed articles therefrom for discharge from the machine.

25. A machine of the class described comprising a series of male and female mold members each respectively forming a part of a continuous linked series, rotatable mechanism within the machine around which said respective linked series are trained in adjacent relation to form upper and lower runs of the series of connected mold members, means supplying material to one of the mold members in one of the runs of the machine, and means displacing the formed articles from the mold member for discharge from the machine.

26. In a machine of the class described a plurality of complementary mold members linked together to form a continuous series, means continually advancing both of said series, dehydrating means for co-action with the respective mold members, movable with said mold members while imposing a dehydrating effect on the material thereon, and means for waterproofing and drying the formed material on certain of the mold members and prior to discharge therefrom.

27. In a machine of the class described a plurality of complementary mold members comprising male and female elements, connected in linked relation to form two continuous series and each male element adapted for co-action with a particular female element, means insuring true registration and reciprocating movement in parallel relation between a pair of said complementary mold members at certain points within the machine, and means for waterproofing the material formed between said mold members.

28. In a machine of the class described a plurality of female mold members linked to one another, a plurality of male mold members linked to one another, driving means for said respective mold members to form a continuous passage thereof through the machine, said driving means disposed to cause a complete reversal of said mold members when in registered engaged relation, and means for impregnating the formed material between said mold members with waterproofing substance and heating and drying the same.

29. A molding machine to form articles from material, comprising a plurality of linked female mold members to receive material therein, a plurality of male members for co-action therewith advancing synchronously through the machine, guiding means causing approach and recedence of said respective male and female mold members at different points in the travel thereof through the machine, means inverting said mold members when in closed relation with one another, and means effecting transfer of the articles from the one mold member to the other mold member for discharge thereof from the machine.

30. In a molding machine of the class described, a plurality of mold members linked to one another, a plurality of complementary mold members linked to one another to advance synchronously with said first mentioned mold members through the machine, mechanisms supplying the material to be formed on one series of said mold members, mechanisms causing a parallel movement of approach and recedence between said respective complementary mold members, means for dehyrating the material being formed at different stages and with different effects on said material during the progress of the mold members through the machine, and means heating, drying and waterproofing the formed material while in the machine.

31. In a molding machine of the class described a plurality of complementary reciprocating mold members to receive a material for the formation of articles therebetween, mechanisms applying a dehydrating effect upon the material through a mold member, heating means for the material formed by said mold members, and a continuous drive for the machine to cause a continuous operation of the mold members.

32. In a machine of the class described the combination of dies reciprocally movable, means for confining pairs of individual dies in operative molding contact during a predetermined part of the operation, means for separating said dies while moving and means for applying drying heat to the dies after and during separation.

33. In a machine of the class described male and female die members reciprocally movable, means supplying material to be formed between said dies, means inverting said dies within the machine, means heating, drying and waterproofing the formed material between said dies, and means effecting transfer of the formed articles from one of said dies to the other thereof for discharge from the machine.

34. In a machine of the class described complementary male and female die members, means imparting linear travel thereto through the machine, means impregnating material between the dies with waterproofing material, and means causing separation of the dies for discharge of the formed articles.

35. In a device of the character described, a series of linked individual mold members movable in horizontal and perpendicular directions simultaneously, and means for bringing said mold members in molding position adjacent each other.

36. In a molding machine of the class described two series of complemental molds, means moving the same through a complete cycle continuously adjacent and parallel to one another, and a heating stage through which said molds move in separated relation.

37. In a machine of the class described a plurality of complemental mold members linked together in two complete, continuous series, means moving the same through a complete cycle each mold member continuously adjacent to its complemental mold member, and means causing a separation and closure of said mold members at different points in the machine.

38. In a machine of the class described a series of linked male mold members, a similar series of female mold members, means operating the same synchronously within the machine, guiding means therefor to maintain parallel relation between said male and female mold members and cause reciprocation therebetween at different points in the movement thereof.

39. In a machine of the class described mold members complemental with one another, each adapted to be moved in a complete cycle through the machine, means effecting reciprocation between said mold members during forward advance thereof, means supplying material therebetween to be pressed into form, mechanism for dehydrating and drying the material as it is formed, and means effecting a discharge of the formed material.

40. In a molding machine of the class described molds linearly and revolubly movable through the machine, mechanism effecting reciprocation therebetween, means supplying material thereto to be formed, mechanism dehydrating and drying the same, means effecting transfer of the material from one member to the other while in the machine, and means effecting a discharge of the formed material.

41. In a machine of the class described the combination of dies reciprocally movable, means for confining pairs of individual dies in operative molding contact during a predetermined part of the operation, means for separating said dies while moving, and means for drying material formed by said dies.

42. In a molding machine of the class described, molds for forming material therebetween, a drying oven, and means transferring formed material into and from said drying and glazing oven.

43. In a molding machine of the class described means for molding material, a drying oven, means transferring formed material through said oven, and suction means within said oven to withdraw the moisture-laden air therefrom.

44. In a molding machine of the class described means for molding material, a drying chamber, a conveying mechanism effecting transfer of the formed material through said chamber, and suction means within said chamber to remove the moisture derived from the material.

45. In a machine of the class described, molding means for material, means treating said molding means with waterproofing substance, and a heating stage to impregnate the formed material passing therethrough with said waterproofing substance.

46. In a molding machine of the class described, mold members for forming material, an oven through which said mold members are passed to dry the material formed therebetween, and a vacuum means within said oven for removing the moisture laden air therefrom.

47. In a molding machine of the class described a mold member, means carrying the same, means causing the material supplied thereto to take form thereon, means for removing the moisture from the material, and means for impregnating the molded member with waterproofing material.

48. In a molding machine of the class described, linked complementary mold members, complementary interfitting dies on each thereof, adapted to interfit with one another and without contact, and means supplying material therebetween to be formed to the thickness of the separation between said interfitting dies.

49. In a molding machine of the class described, mold members to receive material, vacuum means to draw the material into said members, means for moving the vacuum means with the mold members, automatic means for releasing the vacuum means from the mold members at a predetermined point, and a cushioning means for modifying the action of the releasing means.

In testimony whereof I have hereunto subscribed my name in the presence of two subscribing witnesses.

CLAYTON T. EAID.

Witnesses:
 LE ROY D. KILEY,
 FRED E. PAESLER.